United States Patent [19]  [11] 4,269,389

Ekman  [45] May 26, 1981

[54] COUPLING DEVICE

[75] Inventor: Kjell R. Ekman, Zug, Switzerland

[73] Assignee: Ekman Engineering AG, Switzerland

[21] Appl. No.: 112,488

[22] Filed: Jan. 16, 1980

Related U.S. Application Data

[60] Division of Ser. No. 884,668, Mar. 8, 1978, Pat. No. 4,219,048, which is a continuation-in-part of Ser. No. 691,105, May 28, 1976, abandoned.

[51] Int. Cl.³ .............................................. F16L 37/28
[52] U.S. Cl. .......................... 251/149.6; 137/614.03; 137/614.04; 285/316; 285/375
[58] Field of Search .................... 137/614-614.05; 251/149.1, 149.4, 149.6, 149.7; 285/316, 332.2, 334.3, 375

[56] References Cited

U.S. PATENT DOCUMENTS

| 1,253,309 | 1/1918 | Ulleland | 285/375 X |
| 1,347,834 | 7/1920 | Barber | 285/334.3 |
| 2,254,997 | 9/1941 | Fisher | 137/614.03 |
| 2,304,390 | 12/1942 | Wolfram | 137/614.03 |
| 2,451,218 | 10/1948 | Hengst | 137/614.03 X |
| 2,821,412 | 1/1958 | Frye | 137/614.03 |
| 2,837,352 | 6/1958 | Wurzburger | 137/614.03 |
| 2,931,668 | 4/1960 | Baley | 137/614.04 |
| 3,000,655 | 9/1961 | Piet et al. | 137/614.04 |
| 3,129,919 | 4/1964 | Evans | 251/149.6 X |
| 3,191,972 | 6/1965 | Collar | 137/614.04 |
| 3,285,283 | 11/1966 | Calvin | 137/614.03 |
| 3,583,667 | 6/1971 | Amneus | 251/149.6 X |
| 3,670,770 | 6/1972 | Nelson | 137/614.05 X |
| 3,918,492 | 11/1975 | Karcher | 137/614.04 |

FOREIGN PATENT DOCUMENTS

| 2304796 | 8/1974 | Fed. Rep. of Germany | 285/316 |
| 1015631 | 8/1952 | France | 137/614.03 |

Primary Examiner—Robert G. Nilson
Attorney, Agent, or Firm—Pollock, Vande Sande & Priddy

[57] ABSTRACT

A coupling device has two connectable and disconnectable units. A first unit is provided with a centrally arranged body and an inner casing slidingly arranged between two positions. In a first position, the inner casing cooperates with the central body to keep closed a passage for a fluid medium through the first unit. A second unit has a front section interactable with the inner casing in order to force the casing to a second position against the force of a spring which urges the casing towards the body. In the second position of the casing, the passage for the fluid medium is opened. The second unit also has a valve which closes a passage for the fluid medium when the units are in the disconnected position and opens said passage when the units are in the connected position.

5 Claims, 5 Drawing Figures

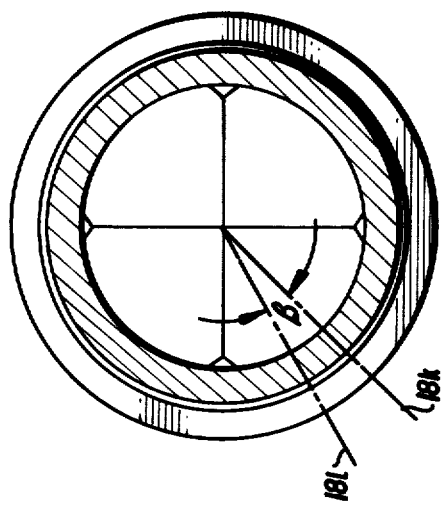
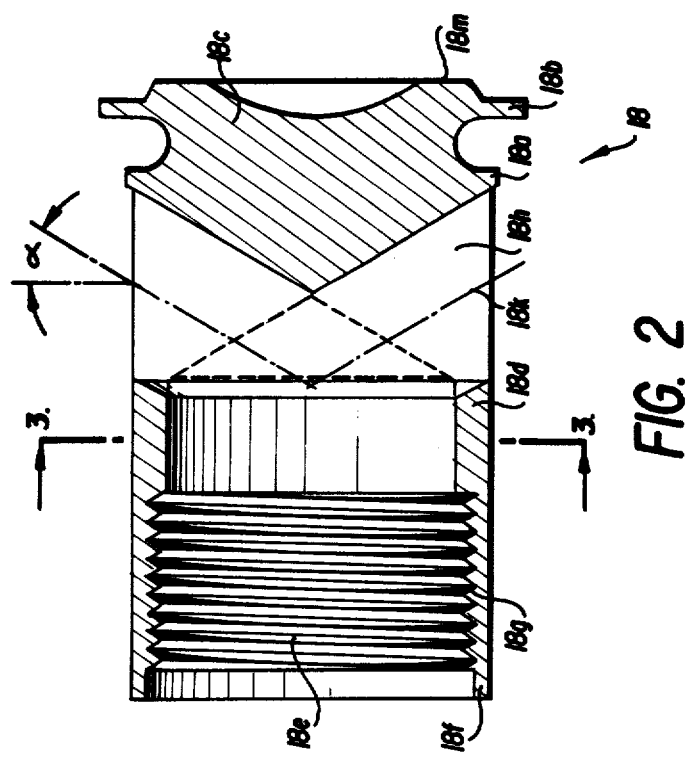

COUPLING DEVICE

CROSS REFERENCE TO RELATED APPLICATION

This application is a division of applicant's U.S. patent application Ser. No. 884,668, filed Mar. 8, 1978, now Pat. No. 4,219,048, which is a continuation-in-part of applicant's U.S. patent application Ser. No. 691,105, filed May 28, 1976, now abandoned.

FIELD OF THE INVENTION

The present invention relates to a coupling device comprising two detachable connectable units, wherein the coupling device is especially suitable in quick-coupling devices when a system under pressure is to be quickly connected or disconnected. The system may consist of a fluid delivery system to which a fluid-receiving equipment is to be connected. The equipment may consist of working machines, working tools or equivalent.

In the system and the connected equipment, pressure shocks of up to 300 kilopond/cm$^2$ (30 MPa) may appear, and the coupling will function to permit the fluid to flow in both directions through the device. The first unit may constitute the connecting part to the system, whereas the second part constitutes the part assigned to the fluid-receiving equipment.

OBJECT OF THE PRESENT INVENTION

In the kinds of coupling devices providing for detachable quick connection, there is a pronounced desire to perform the connection and disconnection of the mentioned equipment to and from the system without any leakage of the fluid. The demands are, to a great extent, determined by environmental aspects which do not allow a fluid in the form of hydraulic fluid, gas, etc., to leak. It is observed that, even if the coupling device in question creates small amounts of leakage at the time of connection and disconnection to and from the system, a great number of connections and disconnections can cause a considerable amount of leakage out of the system, which in the case when hydraulic oil as the fluid medium, creates unacceptable pollution problems.

The present invention is designed especially with considerations to these problems in mind and presents a coupling device with a completely leakage-proof connection and disconnection between systems and equipment of the mentioned kind.

A further object of the invention is to make possible an even and effective fluid flow through the units of the coupling device. The device therefore has a structure — with components which do not disturb said fluid flow, which is important in quick-coupling devices used on connection with measuring apparatus for high accuracy measuring of static and dynamic pressures, vacuum, etc.

A third object of the invention is to attain a simple structure of the units having cheap components for simplified manufacturing.

A fourth object of the invention is to attain a coupling device in which the connection of the units can be performed by a one-hand-grip.

SUMMARY OF THE INVENTION

Characteristic features of the coupling device are that the first unit has a centrally positioned body, an inner casing slidingly adapted in the axial direction of the first unit between two positions, and spring means cooperative with the mentioned casing to attain the first position of the casing in the disconnected position of the units. In said first position, the casing interacts with said body to keep closed a fluid passage through the first and second units. The second unit has a front section interactable with the casing during connection of the units in order to force the casing against the force of the spring to a second position, whereby the medium passage is opened. A valve which is closed in the disconnected position of the units is actuated in the connected position of the units, whereby a medium passage through the second unit is opened when the valve of the second unit is actuated.

In a first embodiment of the invention, the second unit has a front section with an elongated and preferably oblique sealing surface which, via a distinct shoulder, provides a further surface of the second unit positioned below the sealing surface. A seal is then arranged on an end section of the casing that cooperates with the front section of the second unit. The end section of the casing extends beside the front section of the second unit in the second position of the casing, which end section comprises two mutually angled portions, the first of which extends preferably parallel to the front section of the second unit. The second angled portion is directed to the front section of the second unit but extends along only parts of the cross-section of the mentioned seal and adjacent to the further surface of the second unit.

In a second embodiment of the invention, a first valve is connected to the centrally arranged body which has the shape of a second valve. The first valve cooperates with a first valve seat and the second valve cooperates with a second valve seat located on the casing. The first and second valves have the form of tube valves which, at those of their ends which do not face each other, are provided with broadened sealing portions interactable with the first and second valve seats, respectively. The first and second valves include through holes in their side walls (in the goods) adjacent the broadened sealing portions. The through holes are exposed for fluid flow when the casing is positioned in the second position, and the first and second valves are urged to a first axial displacement position by the second unit. The casing is slidably located between the broadened sealing portions of the first and second valves in order to protect sealing means between the casing and the first unit from the main fluid flow which passes inside the first and second valves.

Also, in a third embodiment, a first valve is connected to the centrally arranged body which has the form of a second valve. In a like manner, the first valve cooperates with a first valve seat and the second valve cooperates with a second valve seat situated on the casing. However, the spring of the casing comprises a spring arranged to cause a safe restoration of the first and second valves to their first axial displacement position, whereby the fluid passage through the first unit is closed.

In a fourth embodiment, a valve assembly extends within a first coupling unit and is fixedly attached thereto. A spring biases a casing into contact with the valve, with the casing acting to close off the fluid passage through the coupling. A second coupling unit forces the casing to move toward the first coupling unit to open the fluid passage, only after a fluid-tight seal is established between the second unit and the casing.

BRIEF DESCRIPTION OF THE DRAWINGS

The present invention is illustrated in the accompanying drawings wherein

FIG. 2 is a section in the axial direction of a valve usable in the coupling device shown in FIG. 1;

FIG. 3 is a cross-section of the valve shown in FIG. 2;

DESCRIPTION OF THE PREFERRED EMBODIMENT

Figure 1:
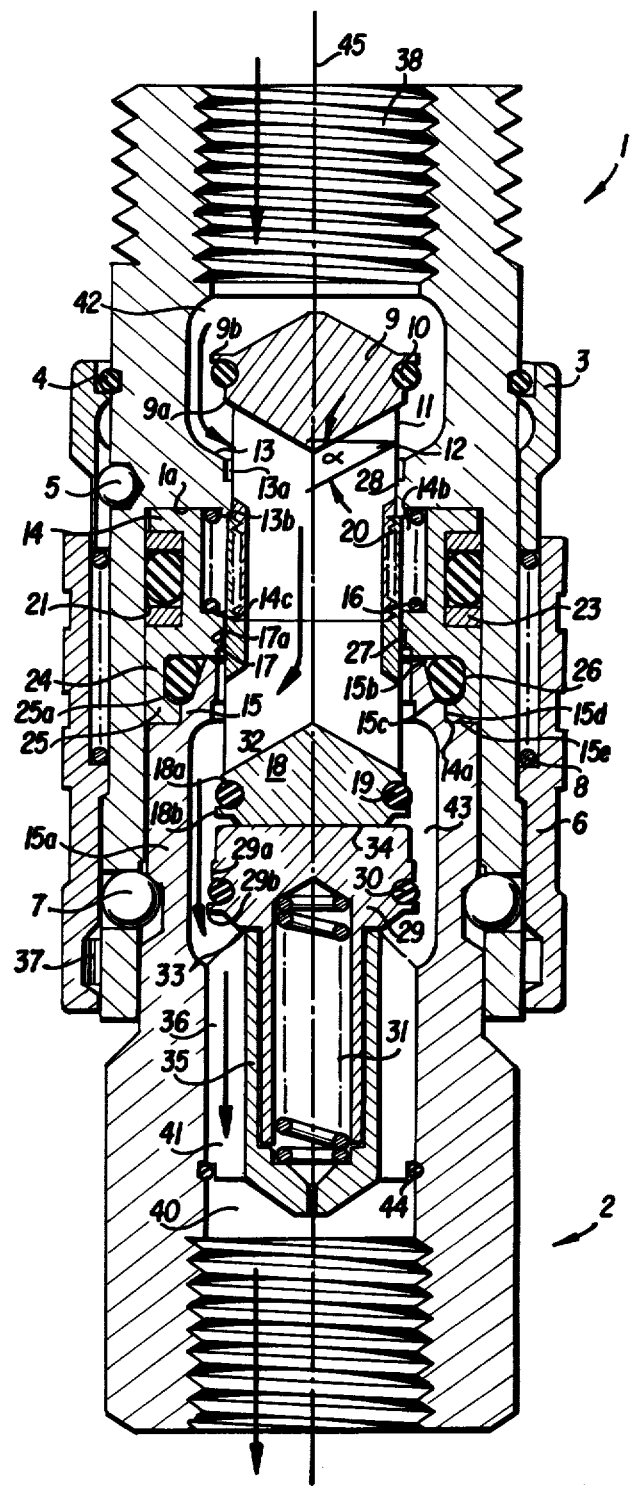
FIG. 1 is a section in the axial direction of the units of the coupling device; the units being shown in their connected position.

In FIG. 1 a first unit forming part of the coupling device is designated 1, whereas a second unit detachably connectable to the first unit is designated 2. Attached to the first unit are known stopping (locking) parts which are intended to lock the units to each other in the connected position thereby preventing unintentional disconnection. The stopping parts comprise a first stop casing 3 which is slidingly positioned in relation to the first unit between end positions determined by a locking ring 4 and locking ball 5, for which the stop casing 3 has an inner axial groove, thereby allowing the casing 3 to be slidable on the first unit, and a peripherally ring-shaped inner groove allowing the casing to be turned to a stop position (not shown in the FIG. 1) in the axial position determined by the locking balls.

The stopping device also comprises a second stop casing 6 which is slidingly positioned in the axial direction of the first unit, and interacts with locking balls 7 that interact in turn with unit 2 via grooves in the latter. Between the first and the second stop casings, a helical spring 8 is positioned to separate said casings. The stopping device has no bearing upon the invention proper except for the one instance evident from the disclosure. Thus, the composition and function of the stopping devices will not be discussed in detail.

The first unit 1 comprises a first valve 9 in the longitudinal direction of said unit, said first valve 9 being slidingly designed with an enlarged sealing section or portion containing a sealing ring 10, and a narrowed section 11 designed as a tube. Said tube has through side holes 12 located adjacent the enlarged section or portion of the valve 9. The side holes in the preferred embodiment, are four in number, with said holes being designed with oblique walls, whereby the axis for each side hole inclines by an angle $\alpha$ relative to a line perpendicular to the symmetrical axis of units 1 and 2. The angle $\alpha$ is chosen between 15° and 65°, preferably 30°, thereby creating an optimal fluid flow.

The enlarged section or portion has both a shoulder 9a, and a flange 9b, the latter to be folded over the sealing ring 10 which fixes the position of said ring 10 on the valve. The flange 9b is shown in the un-folded position. The first unit 1 also includes a first valve seat portion 13, against which the first valve 9 and its sealing ring 10 rests in the disconnected position of the units 1 and 2. The seat portion 13 is designed with a shoulder 13a, creating a mechanical stop or "sink limitation" for the valve 9. In the disconnected position, it is assumed that a fluid works against the enlarged section of the first valve 9, causing said valve to be pressed against the first seat portion 13, thereby closing the outgoing passage for fluid flow through the system. The passage is connected to the first unit through tubing or other connecting pipe.

Adjacent to the first seat portion 13 positioned an inner casing 14 encloses the narrowed section of the first valve 9 and moves slidingly between first and second positions in relation to the position of the first seat portion 13 and the first valve 9.

The casing 14 is actuated by means of the front section or parts 15 of the second unit 2, between a fully connected position shown in FIG. 1 and identified as the second position, and a disconnected or first position. A first helical spring 16 biases said casing to said disconnected or first position. In the outer position, the casing 14 is positioned opposite the locking balls 7 of the stopping parts.

The inner casing 14 is designed with a second valve seat portion 17 for a second valve 18, which, like the first valve, is designed with an enlarged section or portion having a sealing ring 19, and a narrowed tubular section with through side holes in said tube adjacent the broadened section of the second valve 18. The second valve 18 has on its enlarged section a shoulder 18a and a foldable flange 18b of equivalent function as the shoulder 9a and the flange 9b of the first valve 9. The side holes of the second valve 18 are of equivalent kind and number as the corresponding holes 12 of the first valve 9. The inner casing 14 has a cavitation 17a with a bottom surface which provides a mechanical stop or so called "sink limitation" for the mutual movements of the casing 14 and the second valve 18. The second valve 18 is mechanically connected to the first valve 9 by means of threads formed on the ends of the narrowed parts of the first and second valves. The narrowed tube-formed part of the first valve 9 is equipped with an outer thread 20 interactable with an inner thread of the narrowed tube-formed part of the second valve 18. Due to the mechanical connection, the movement of the second valve 18 is coordinated with the movement of the first valve 9. The resulting protruding end edge of the narrowed section of the second valve forms a stopping edge which is interactable with a blocking edge 13b of the seat portion 13. The interaction between the stopping edge and the blocking edge 13b produces a limit to the displacement of the first and second valves in one direction. Said limit defines a first axial displacement position (shown in FIG. 1) of the first and second valves with said valves also having a second axial displacement position. (When the first and second units are disconnected).

FIGS. 2 and 3 show the second valve in a more detailed form. In FIG. 2, the inner thread on the second part is designated 18g, and the protruding edge 18f. The foldable flange on the enlarged sealing section 18c is designated 18b, while the flange or shoulder in the "sink-limitation-device" is designated 18a. Four holes 18h in the side wall 18d are positioned with the axis 18k of each hole 18h inclining at the angle $\alpha$ in relation to a cross-section plane perpendicular to the paper plane of FIG. 2. In the section of FIG. 3, the axis 18k extends radially with respect to an axial line through said value 18. However, said holes 18h may be inclined with respect to said axis 18k by forming holes 18h which follow line 18i that is inclined at the angle $\beta$ in relation to said axis 18k. The main fluid flow through the coupling device passes through the space 18e inside said second valve 18. In the parts of the narrowed section adjacent the outlets (inlets) of the holes, the valve 18 has aspherical form making possible an even fluid flow.

In the unconnected position of the units 1 and 2, the second seat portion 17 of the casing 14 is pressed against the sealing ring 19 of the enlarged section of the second valve 18 by the spring 16.

The casing 14 is guided by an inner guiding surface or wall 21 of unit 1, which acts as a holder for a sealing ring 22 and provides a sealing relationship between the outer side of the casing 14 and the guiding surface 21 of the unit 1.

The sealing devices 22 consist of a sealing ring 22 between support packing rings 23 of Acetal, Teflon, etc. The sealing ring 22 consists of a standard O-sealing-ring of Nitril, Viton, etc. As an alternative, a conventional sealing of the piston packing type may be used. The casing 14 is equipped with a prolonged outer edge or end section 24 at an end which interacts with the second unit. Edge 24 at its outer end has an inwardly directed flange 25 positioned to form a space for a sealing ring 26. Members 24 and 25 may be described as two angled portions; the first angled portion 24 and the second angled portion 25. Furthermore, the casing has a guiding surface 27 for the narrowed section of the second valve 18 with a corresponding guiding surface 28 positioned on the first valve seat portion 13 of the narrowed section of the first valve. The casing 14 also has an inner recess 14b directed towards the common axis 45 of the first and second units. In said recess 14b, the spring 16 is positioned between an end wall 14c of the recess 14b and an end wall 1a of the unit 1. The casing 14 is also provided with a corresponding recess on the outer side of the casing 14 for the sealing means 22, 23.

The second unit 2 is equipped with a front section (nipple) 15a in the form of a casing, and a valve, hereafter called the third valve 29, being designed with both an enlarged section with a sealing ring 30, and a narrowed section. The third valve is actuated by a second spring 31, which urges the third valve to a position wherein it bears against a third seat portion 32, located at the inner surface of the casing-formed outer section 15a. Also, the third valve 29 has a shoulder 29a and a flange 29b to be folded thereover, wherein each part functions in an equivalent manner to the units of the first and second valves 9, 18. In the fully connected position of the units 1 and 2, the third valve 29 is in a position wherein the lower part of the enlarged section of the third valve 29 bears against a stopping surface 33 within the second unit. The enlarged section of the third valve 29 has a smooth end surface 34 interactable with a corresponding smooth end or contact surface 18m of the enlarged section of the second valve 18. Said contact surfaces are ring-shaped as shown in FIG. 2. The front section 15a forms a casing while the third valve 29 of the second unit 2 is designed such that when the second unit 2 is unactuated, the end surface of the third valve is in flush contact with the seat 32 formed in the front section 15a.

The front portion 15, which is formed as a casing of the second unit has an inwardly bend section which, in the connected position of the units 1 and 2, will be essentially parallel with the first angled portion 24 of the casing 14, and which through a slanting sealing surface 15b of its outer side interacts with the sealing ring 26. The sealing surface 15b is elongated and ends in its lower parts having a distinct shoulder 15d. The end surface of the inwardly bent section is interactable with a transversely opposite surface of the casing 14. On the front section 15a of the second unit is arranged a transverse shoulder 15e interactable with an opposite, transverse surface 14a of said casing 14 positioned on the outer side of the inwardly folded second portion 25. Thus, the first portion 24 of the casing 14 and the inwardly bent section of the front part of the second unit are the same length. The second portion 25 has an inner surface 25a positioned opposite the distance shoulder 15c when the units 1 and 2 are in the connected position. The distinct shoulder and inner surface from a bottom for the sealing ring 26. The second portion 25, or its inner surface 25a, then extends only along a part of the cross-section of the sealing ring. The second portion and shoulder extend along 15%-90% of the cross-section, preferably 40%-60%, and in the shown embodiment 50%. The front section also has a further surface 15d located adjacent the sealing surface and distinct shoulder. The free end of the second portion 25 is adjacent to said further surface in order to form a small space between the front section of the second unit and the inner casing 14. Because of the structure of the slanting surface 15b, the distinct shoulder 15c and the second portion 25 of the casing the space is in communication with the sealing ring 26, which guarantees an effective sealing function.

The second unit 2 has a centering device 35 for the narrowed section of the third valve 29. The centering device 35 comprises a hub section and spoke formed parts 36 that are positioned in the longitudinal direction of the second unit; whereby the fluid to be transmitted may pass in the longitudinal direction of the second unit.

In the disconnected position of the units 1 and 2, the first valve 9, according to the above, is actuated against the first seat portion 13 by the pressure of the fluid to be transmitted. The casing 14 is brought to its first position by said first spring 16. In this position, the seat portion 17 of the casing 14 bears against the sealing ring 19 of the second valve 18. The casing 14 is positioned opposite to the locking balls 7; thereby the stop casing 6 is kept in a blocking position by the locking balls 7, wherein the latter interacts with the groove 37 in the stop casing 6. This feature facilitates the connection of the units 1 and 2 of the coupling device. In the second unit, the third valve 29, is actuated by a second spring 31 to interact with the third seat portion 32. Thus, the position of the valves blocks the fluid pressure via the incoming passage 38, from being efficiently transmitted past the first and second valves, with the casing 14 sealing the through side holes of the narrowed section of the second valve 18. The outgoing passage 40 of the second unit 2 is sealed by means of the third valve 29. The springs 16 and 31 are chosen so as to achieve a proper seal against the prevailing pressure present when the units are in the disconnected position.

In the above described embodiment, the first spring 16 consists of a helical spring of 15.0 mm diameter, the wire 1.3 mm and length in unactuated condition 35.0 mm. Corresponding dimensions of the second spring 31, which is also designed as a helical spring, are; diameter 5 mm, wire diameter 1.0 mm, and length in unactuated condition 30 mm. The springs are constructed of conventional spring material. The sealing rings referred to may be made of Nitril, Viton, etc. The coupling has a total length of about 90 mm and the diameter of the first unit is about 30 mm. The shown coupling is intended to achieve a leak-proof detachable connection for a system under pressure. The connection and disconnection itself are performed according to the above at low pressure, even if the pressure of the system and the connected equipment momentarily may reach 300 kilopond/cm$^2$ (30 MPa). By adding a known pressure eliminator (not shown) the present coupling device may simply be positioned for connection even in cases of high pressures.

Due to the design of the above described parts, the assembly of the coupling device itself is simple and economical. As to the assembly of the first unit 1, the first spring 16 and the casing 14 are first brought into position in the ring formed cavitation in the first unit. After that, the valve 9 is brought in from one end of the unit, while the valve 18 is brought from the other end of the unit, with the mentioned valves being screwed together. During assembly of the second unit the valve is brought in via that end of the second unit which is opposite from the first unit, and after that, the centering parts 35, 36 are brought into the second unit via the same end and locked by a locking ring 44.

FUNCTION OF THE PREFERRED EMBODIMENT

The operation of the valves following connection of parts 1 and 2 depends on the pressure conditions at the connections 38 and 40. Presuming, that the pressure is highest at 38, the second and third valves will be opened first, and the first valve 9 last; this order being due to the interaction between the casing 14 and the front sections 15 of the second unit, and the contact between the second and third valves via their smooth end surfaces. If the pressure is higher at the connection 40 than at 38, the first valve 9 will be opened first and after that the third and second valves 18 and 29, respectively.

Due to the design of the front section 15a of the second unit 2, and the design and location of the sealing ring 26, a safe seal is achieved before any of the three valves are actuated from their sealing positions; this being important for establishment of a leak-proof connection.

Following the opening of all the valves, a through passage is created, which in the case when the pressure at 38 is higher than that at 40, runs as is shown by the continuous arrow 41. If the pressure is higher at 40, the arrow will face the opposite direction. The passage, according to the arrow 41, runs through space 42 at the side of the broad section of the first valve, through the side holes 12 of the narrowed section of the first valve, within the narrow section, through the narrow section of the second valve, through the side holes in the narrow section of the second valve, through a space 43 at the side of the enlarged sections of the second and third valves, and finally between the spoke-formed parts 36 in the second unit. None of the fluid can leak during the connection of the coupling due to first valve 9 being lifted last from its seat, with a leak-proof being made by means of the sealing rings 22 and 26.

During the disconnection of the units 1 and 2, the second valve 18 is first actuated against its seat 17 of the casing 14; after which the third valve is closed against the seat 32. Finally, the first valve 9 moves towards its seat part 13. The disconnection from the fully connected position is preceded by manual actuations on the stop casings 3 and 6, during which, an axial displacement of the stop casing 6 takes place, with the groove 37 in said stop casing 6 being positioned opposite to the locking balls 7, which then can be pressed out into the groove to provide manual disconnection of the units. It is observed that if, in the connected position of the units 1 and 2, the pressure of the system is high (for instance up to 300 kilopond/cm$^2$ or 30 MPa), there will be no separation of the units because of the force which presses the locking balls 7 against both the smooth surface of the stop casing 6 and the slanting front wall of the groove of the unit 2. The force prevents a longitudinal displacement of the stop casing 6. Thus, the quick-connect coupling allows disconnection at only low pressures, when forces on the locking balls can be overcome by manual power on the stop casing 6. In the case of a high pressure, a reduction of the pressure in the system must first take place, as by means of a cut-off valve or similar. Due to the fact that the second and third valves 18, 29 interact by their smooth end surfaces, oil leakage is eliminated with the shown construction.

The interaction between the shoulder 13b of the first seat portion and the protruding end surface of the narrowed section of the second valve 18 results in the required flow areas being achieved simultaneous with the completion of the movements of the second valve 18 in one direction.

Figure 4A:
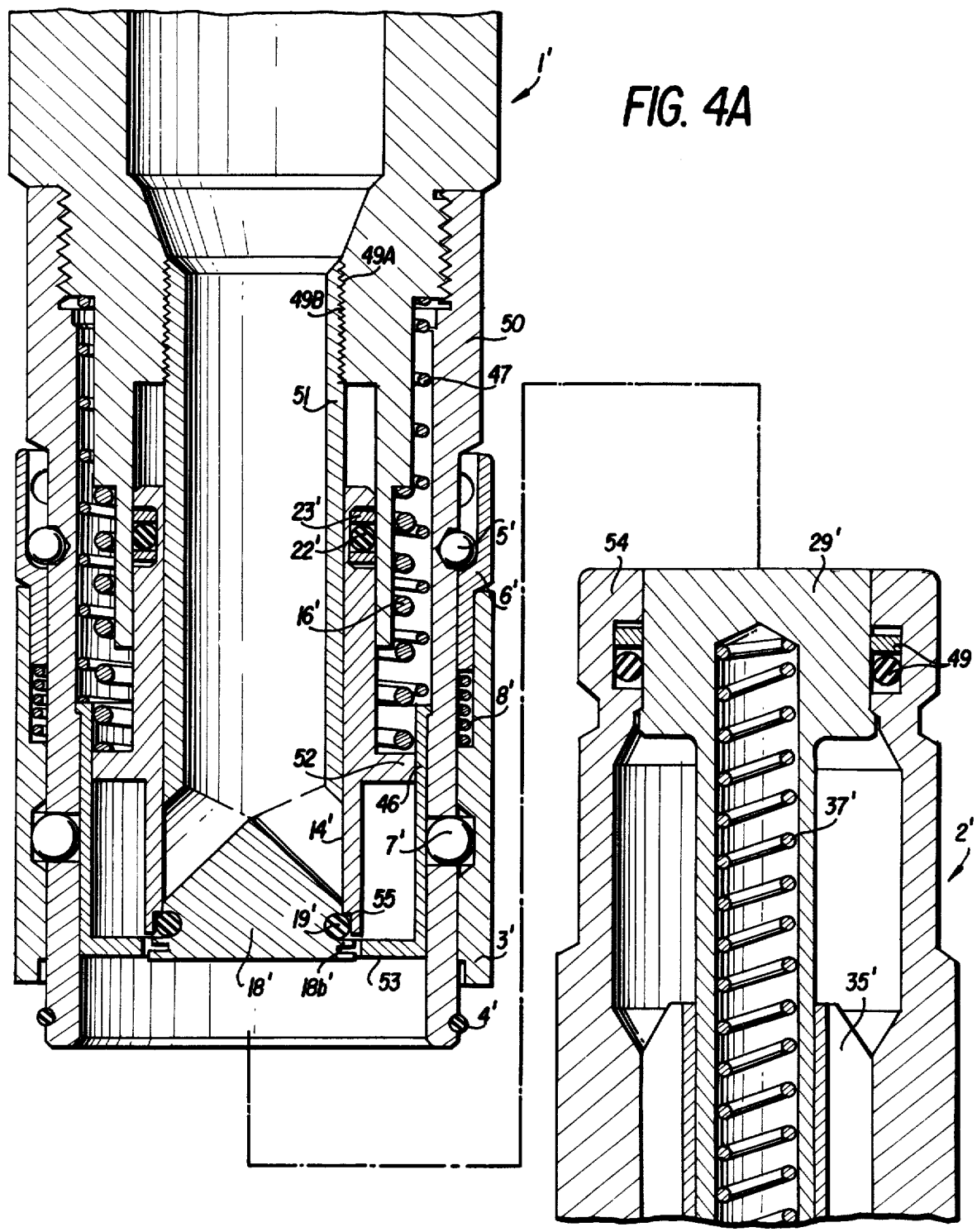
FIG. 4A is a cross-section in an axial direction of the coupling units of a further preferred embodiment, wherein the coupling units are in the disengaged position; and, FIG. 4B is a view of the embodiment of FIG. 4A with the coupling units in the engaged position.
Figure 4B:
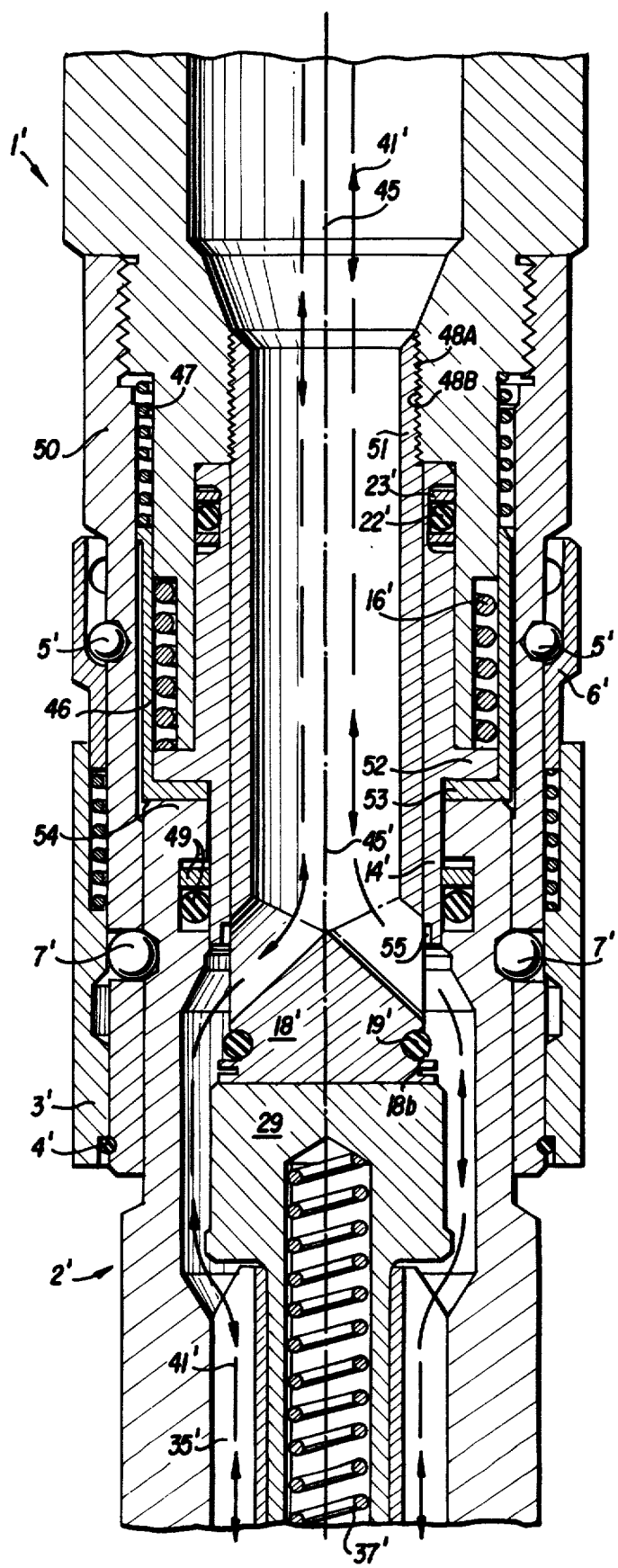

A further preferred embodiment of the present invention is shown in FIGS. 4A and 4B, wherein elements similar to elements in the preceding embodiments have been given similar numerals with the addition of a prime (') designation.

A fluid coupling is comprised of first and second hollow coupling units designated 1' and 2', respectively. A hollow casing 50 surrounds and is attached to an end portion of unit 1'. Casing 50 slidably supports a pair of hollow stop casings 3' and 6' with locking ring 4' limiting the axial movement of casing 3'. Locking balls 5' and 7' selectively prevent sliding movement between casings 50, 3' and 6' which locks units 1' and 2' into a connected position thereby preventing unintentional disconnection. A helical spring 8' biasingly retains casing 3' in the locked position in a manner similar to the preceding embodiments.

First unit 1' is cylindrically shaped and includes a plurality of threads 48A formed in an interior surface portion thereof. A valve assembly 18' includes an elongated, cylindrically shaped hollow end portion 51 insertable into cylindrically shaped unit 1'. Hollow end portion 51 includes threads 48B formed on an outer surface thereof, which fixedly engage with threads 48A of unit 1'.

A hollow, inner casing 14' is slidably positioned between the end portion 51 of valve 18' and a cylindrically shaped end portion of coupling unit 1'. A sealing device, including sealing ring 22' and packing rings 23', is supported in a groove formed in casing 14' and provides a fluid seal between casing 14' and coupling unit 1'.

Casing 14' further includes an integral hub portion 52 extending in the direction of casing 50. When coupling units 1' and 2' are in the connected position, a side wall portion of hub 52 abuts the cylindrically shaped end of coupling unit 1', while a biasing spring 16' is compressed between hub 52 and coupling unit 1'. Spring 16' attempts to force hub 52 and casing 14' out of engagement with coupling unit 1'.

A further, hollow casing 46 is slidably positioned between coupling unit 1' and casing 50, with a portion of casing 46 being supported by hub 52. Casing 46 includes an elongated end portion 53 extending in the direction of valve 18'. A biasing spring 47 is compressed between casing 46 and a wall portion of coupling unit 1', with spring 47 attempting to force hub portion 53 of casing 46 out of abutting contact with hub 52 of casing 14'.

Hollow, cylindrically shaped coupling unit 2' includes a flat end portion 54 which is pressed into abutment with end portion 53 as coupling unit 2' is slidably inserted between casing 50 and valve 18'. Further pressure or unit 2' forces end portion 53 into abutment with hub 52 and moving both casings toward coupling unit 1', while compressing biasing springs 16' and 46, respectively, until end portion 54 has forced hub 52 and casing 14' into abutting contact with coupling unit 1'.

Coupling unit 2' further includes a circumferentially extending groove formed on an inner surface thereof, which supports a sealing assembly 49 comprised of a sealing ring and associated packing ring. As end portion 54 of coupling unti 2' slides along casing 14', sealing assembly 49 forms a fluid tight connection between casing 14' and coupling unit 2'.

A passageway extends through hollow portion 51 and joins with a plurality of oblique holes extending through the wall surface of valve 18' to form a fluid passage through valve 18'. Valve assembly 18' further includes a solid end portion adjacent the through holes and a circumferentially extending groove formed in an outer surface thereof, with a sealing ring 19' positioned within the groove. A foldable, circumferentially extending flange 18b' is positioned adjacent to and deforms into contact with sealing ring 19' to provide structural support for the ring 19'.

A further valve assembly 29' includes an end portion abutting an end portion of valve 18'. Valve 29' if formed as an elongated body including splines 35' engaging similar splines formed on coupling unit 2'. A fluid passageway is indicated by arrow 41' and extends between valve 29' and an inner surface of coupling unit 2' and between splines 35'.

The operation of the further preferred embodiment will now be discussed in detail.

When the fluid coupling is in the disengaged condition as shown in FIG. 4A, coupling unit 2' is withdrawn from contact with end portion 53. Biasing spring 47 expands and forces casing 46 to move until end portion 53 is positioned approximately adjacent to the end of casing 50, while biasing spring 16' simultaneously expands and forces casing 14' to slide relative to cylindrical portion 51 until a recessed end portion 55 of casing 14' abuts sealing ring 19' forming a fluid-tight seal therebetween.

When it is desired to interconnect coupling units 1' and 2', end portion 54 of coupling unit 2' is inserted into casing 50. End portion 54 first abuts end portion 53, forcing casing 46 to compress spring 47.

Further movement of end portion 54 brings end portion 53 into contact with hub 52. It is very important to note that before hub 52 is moved, a fluid seal is established between coupling unit 2' and casing 14' via sealing assembly 49. This prevents any fluid from accidentally leaking out of the coupling during the connection procedure.

As end portion 54 continues to move in the direction of coupling unit 1', end portion 53 and hub 52 are forced to move in the same direction. Movement of hub 52 and attached casing 14' opens the fluid passageway through valve 18', as shown in FIG. 48. End portion 54 of coupling unit 2' continues to move until casing 14' abuts coupling unit 1' allowing the locking balls 7' to be placed in the locked position.

This embodiment differs from the preceeding embodiments primarily in that valve assembly 18' is permanently attached to coupling unit 1', rather than floating within the coupling device. Yet, all of the preferred embodiments create a fluid tight connection before allowing any fluid to pass through the coupling device.

The invention is not restricted to the preceeding embodiments (and as an example shown embodiment), but may be subjected to modifications within the scope of the following patent claims.

What I claim is:

1. A coupling device for supplying fluid from a presurized source to an output conduit without leakage, said coupling device comprising:
   a first coupling part having an axial fluid flow passage extending therethrough;
   a second coupling part having an axial fluid flow passage extending therethrough;
   said first and second coupling parts each having on a respective first end thereof means to permit the detachable coupling of said parts with their respective axial flow passages aligned to permit fluid flow therethrough;
   a first means supported within said first end of said first coupling part and supporting thereon an elastic sealing ring;
   a second means on said first end of said second coupling part which abuts said first means when said first and second coupling parts are brought into coupling relationship;
   said first and second means acting to compress said elastic sealing ring at least radially as said first and second means are brought into said coupling relationship;
   said coupling device further including a valve assembly axially slidably supported within a mating bore formed in at least one of said coupling parts;
   said valve assembly including a substantially cylindrically-shaped hollow portion formed with a plurality of apertures extending through wall portions thereof, and said valve assembly further including a pair of enlarged end portions attached to opposite ends of said hollow portion, with each portion simultaneously engaging a separate valve seat formed at both ends of said bore to prevent fluid flow therethrough;
   and control means for sequentially separating said enlarged end portions from their respective valve seats only after said first and second means form a fluid-tight seal between said coupling parts.

2. A coupling device according to claim 1, wherein said first means comprises an annular recess supporting said elastic sealing ring therein;
   said first means further comprises an annular flange portion of said first coupling part which confronts and contacts said second means to provide a fluid-tight seal therebetween during connection of said first and second coupling parts.

3. A coupling device according to claim 2, wherein said second means comprises an annular shoulder portion formed on said second coupling part which abuts said annular flange portion during connection of said coupling device;
   said second means further comprises said annular shoulder having a frusto-conical surface extending toward said first coupling part, wherein said frusto-conical surface provides increasing radial and axial compressive forces on said elastic sealing ring as said first and second means are brought into abutting relationship.

4. A coupling device according to claim 2, wherein said recess in said first means faces said axial flow passageway through said first coupling part.

5. A coupling device according to claim 1, wherein a compression spring extends between a portion of said first coupling part and a portion of said first means, urging said first means toward said second coupling part.

* * * * *